Figure 2:
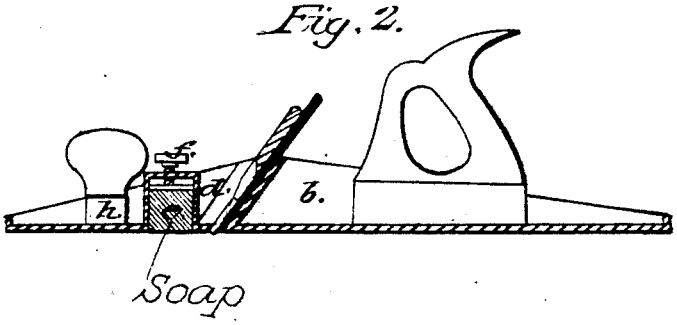
Figure 1:
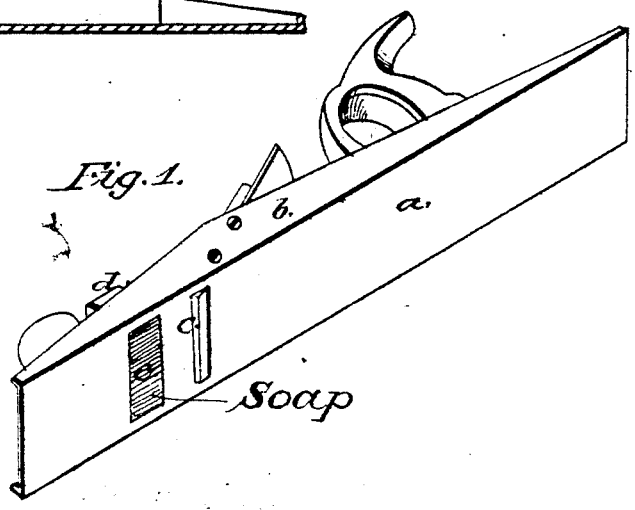
Figure 3:
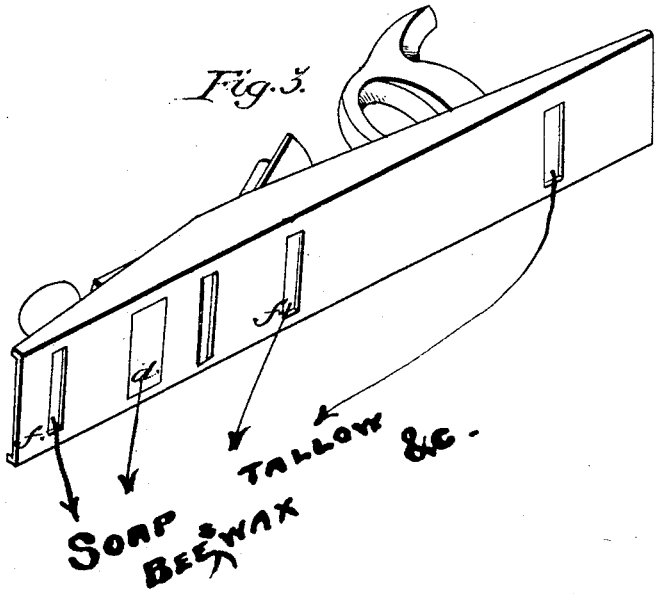

W. Foster,

Bench Plane.

No. 68. (A1) Patented Mar 16. 1844.

Bench Planes.
Lubricating Attachments

W. Foster,

Bench Plane.

No. 68 (A.I.) Patented Mar. 16. 1844

J. PETERS, PHOTO-LITHOGRAPHER, WASHINGTON, D. C.